Oct. 21, 1924.  
L. L. DICKMAN  
TIRE CASING SPREADER  
Filed May 24, 1923  
1,512,278
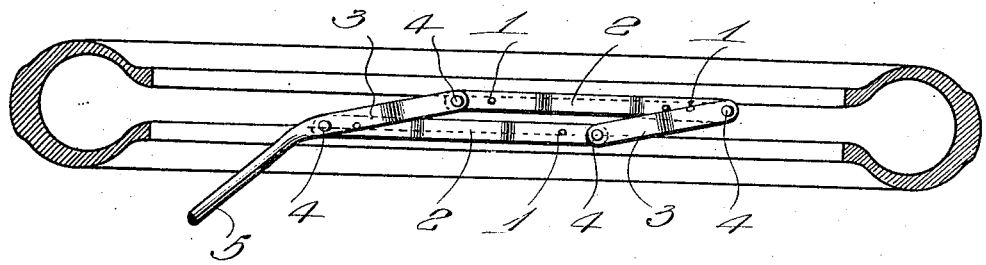
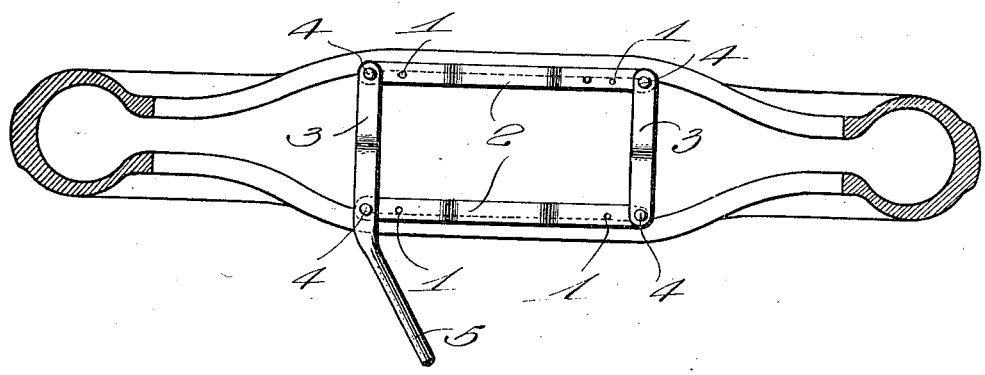
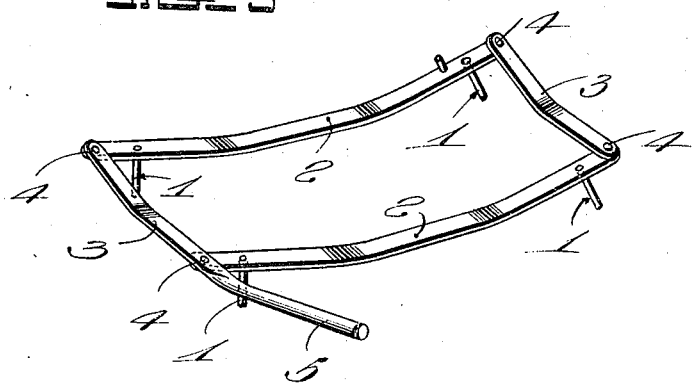
Inventor  
Lloyd L. Dickman
Witness Patented Oct. 21, 1924.

1,512,278

UNITED STATES PATENT OFFICE.

LLOYD L. DICKMAN, OF COLLEGE VIEW, NEBRASKA.

TIRE-CASING SPREADER.

Application filed May 24, 1923. Serial No. 641,230.

*To all whom it may concern:*

Be it known that I, LLOYD L. DICKMAN, a citizen of the United States, residing at College View, in the county of Lancaster and State of Nebraska, have invented certain new and useful Improvements in Tire-Casing Spreaders; and I do declare the following to be a full, clear, and exact description of the invention, such as will enable others skilled in the art to which it appertains to make and use the same.

My invention relates to improvements in tire tools and more particularly to those which are intended for spreading tire casings, to locate obscure objects which have penetrated the tread and caused puncture, or for spreading the casing for any other purpose, such as applying an inside patch.

It is the object of the invention to provide an extremely simple and inexpensive tire casing spreader operable by a single hand operation to spread an appreciable arc of the casing and hold it in a spread condition as long as desired.

With the foregoing in view, the invention resides in the novel subject matter hereinafter described and claimed, the description being supplemented by the accompanying drawing.

Figure 1 is a sectional view of a tire and a plan view of the spreader applied thereto, before operation.

Figure 2 is a duplicate of Fig. 1 with the exception that it illustrates the casing spread by means of the tool.

Figure 3 is a perspective view of the spreading tool.

In carrying out the preferred form of my invention which has been selected for illustration in this application, I provide an elongated transversely expansible and retractible frame having suitable projections such as the pins 1, for reception between the beads of a tire casing when the frame is in the retracted position shown in Fig. 1. Thus, when the frame is expanded as disclosed in Fig. 2, the beads and side walls of the casing will be separated, so that easy access is had to the interior of said casing, for any required purpose.

In the construction shown, the frame above referred to, which constitutes a part of hand-actuated operating means for sets of expanders shown as projecting pins, comprises a pair of parallel side bars 2 and a pair of end bars 3 which are pivoted at 4 to said side bars, so that the several bars may have parallelogrammatic movement in transversely expanding and retracting the frame. The pins 1 may be located at any desired points on the frame, but these pins are preferably carried rigidly by the end portions of the side bars 2.

For the purpose of moving the frame in the necessary manner to expand or contract the same, I have shown one of the end bars 3 provided at one end with a rigid operating handle 5, transforming this bar into an operating lever for the remainder of the frame.

When using the device, the frame is collapsed or retracted and the pins 1 are inserted between the tire beads as illustrated in Fig. 1. Then, by means of the handle 5 the frame is expanded, thus effectively spreading the casing throughout an appreciable portion of its circumference and giving easy access to its interior. If the inside of the casing is to be inspected throughout its circumference, it will be obvious that the device, either before or after expanding the same, may be advanced circumferentially, as required.

As excellent results have been obtained from the details disclosed, these details are preferably followed, but within the scope of the invention as claimed, numerous changes may be made.

I claim:

1. A tire casing spreader comprising a frame consisting of side and end members pivoted together for parallelogrammatic movement to transversely expand and contract the frame, and projections carried by said frame and receivable between the beads of a tire casing when the frame is contracted, whereby expansion of the frame will spread the casing.

2. A tire casing spreader comprising a frame consisting of side and end members pivoted together for parallelogrammatic movement to transversely expand and contract the frame, an operating handle formed on one end of one of said end members of the frame, and projections carried by said frame and receivable between the beads of the tire casing when the frame is contracted, and whereby expansion of the frame will spread the casing.

In testimony whereof I have hereunto affixed my signature.

LLOYD L. DICKMAN.